(12) United States Patent
Quaglino

(10) Patent No.: US 7,121,939 B1
(45) Date of Patent: Oct. 17, 2006

(54) UTENSIL CONFIGURED FOR OPENING SHELLFISH SHELL AND METHOD FOR PROVIDING SAME

(76) Inventor: Anthony Crosby Quaglino, 311 S. Cassidy Dr., Georgetown, TX (US) 78628

( * ) Notice: Subject to any disclaimer, the term of this patent is extended or adjusted under 35 U.S.C. 154(b) by 0 days.

(21) Appl. No.: 11/384,680

(22) Filed: Mar. 20, 2006

(51) Int. Cl.
*A22C 29/02* (2006.01)

(52) U.S. Cl. ............................................ 452/6; D7/649

(58) Field of Classification Search ................ 452/1–6, 452/102–105; 30/120.1–120.5, 136, 137, 30/142, 147–149, 157, 165, 371, 501–503, 30/503.5, 505, 287, 288, 353; D7/649–651, D7/693, 381; D8/98, 99, 101
See application file for complete search history.

(56) References Cited

U.S. PATENT DOCUMENTS

| | | | |
|---|---|---|---|
| 720,202 A | | 2/1903 | White |
| 1,843,223 A | | 2/1932 | Hasseler |
| 2,685,734 A | * | 8/1954 | Klein ........................... 30/144 |
| 2,822,845 A | | 2/1958 | Medlin |
| 3,270,368 A | * | 9/1966 | Cook, Sr. et al. ............ 452/105 |
| 4,172,306 A | * | 10/1979 | Hopkins ........................ 452/6 |
| 4,200,961 A | | 5/1980 | Mueller |
| 4,519,136 A | | 5/1985 | Walker |
| 4,521,964 A | * | 6/1985 | Maruyama .................... 30/148 |
| 4,569,103 A | * | 2/1986 | Taurinskas ...................... 452/6 |
| 4,802,260 A | | 2/1989 | Fletcher |
| D306,675 S | * | 3/1990 | Stiggers ....................... D7/695 |
| 5,080,629 A | | 1/1992 | Ellison |
| 5,403,230 A | * | 4/1995 | Capriglione, Sr. ............. 452/6 |
| 5,586,931 A | * | 12/1996 | Williams, Jr. .................. 452/6 |
| 5,613,904 A | * | 3/1997 | LaSalle et al. ................. 452/6 |
| 6,129,622 A | | 10/2000 | Seaman |
| 6,360,442 B1 | * | 3/2002 | O'Brien et al. ............. 30/123.5 |
| 6,398,635 B1 | | 6/2002 | DeMezzo |
| D461,998 S | * | 8/2002 | Sylva et al. ................. D7/650 |
| 6,503,137 B1 | | 1/2003 | Maille |
| D496,563 S | * | 9/2004 | Marsden et al. ............. D7/650 |

* cited by examiner

*Primary Examiner*—Thomas Price
(74) *Attorney, Agent, or Firm*—David O. Simmons

(57) ABSTRACT

A knife comprises an elongated handle, a blade attached to and extending longitudinally from an end of the handle, and a shell-slitting tine attached to the blade adjacent a tip portion of the blade. A first longitudinal edge of the blade is generally blunt and a second edge of the blade is specifically configured for severing objects. A slot extends between the shell-slitting tine and the blade from a tip end of the blade toward the handle. The slot extends generally parallel with a centerline reference axis of the blade and is positioned between the centerline reference axis of the blade and the first one of said longitudinal edges. At least a portion of an edge of the shell-slitting tine defined by the slot is sharpened and the tip end of the shell-slitting tine is substantially even with the tip end of the blade.

19 Claims, 1 Drawing Sheet

UTENSIL CONFIGURED FOR OPENING SHELLFISH SHELL AND METHOD FOR PROVIDING SAME

FIELD OF THE DISCLOSURE

The disclosures made herein relate generally to eating and food preparation utensils and, more particularly, to eating and food preparation utensils configured for opening shellfish shells.

BACKGROUND

Typically shellfish (i.e., also known generally as a crustaceans) food items such as crab legs and lobster tails and claws are commonly boiled in their shell and served while still in their shell. This form of preparation and serving requires the person eating these shellfish food items to break open the shell in order to extract the shellfish meat for consumption. The heat does not significantly change the characteristics of the shell and a special utensil is often required to open (e.g., slit open, break open, cut open, etc) the shell.

There have been various different tools and utensils designed for this purpose. However, these known utensils are known to have one or more limitations. Examples of such limitation include, but are not limited to, damaging shellfish meat while opening the shell, being awkward to use and being a utensil that only provides the functionality of opening a shellfish shell. U.S. Pat. No. 5,613,904 to LaSalle discloses a utensil for opening shellfish shells, which exhibits the limitation of use only as a utensil for opening shellfish shells. U.S. Pat. No. 4,569,103 to Taurinskas discloses a crab leg knife that serves the function of opening a shellfish shell, which exhibits the limitation of use only as a utensil for opening shellfish shells. U.S. Pat. No. 4,200,961 to Mueller discloses a fork that serves two purposes (i.e., one being opening shellfish shells and the other being standard fork functionality), which exhibits the limitations of its configuration resulting in meat of the shellfish being damaged while opening the shell and being somewhat awkward to use due to a protruding portions of the utensil (i.e., a fork tine) pushing into the shellfish shell while opening the shell. U.S. Pat. No. 4,172,306 to Hopkins discloses a knife for opening crab legs and other such shellfish shells, which exhibits the limitation of use only as a utensil for opening shellfish shells. U.S. Pat. No. 2,822,845 to Medlin discloses a modified butcher knife with a slot at the tip portion. However, the slot of Medlin does not form a second blade. Further, the knife of Medlin is configured to be used in conjunction with another device that provides a pivot point within the slot to allow greater force to be applied by a primary knife edge of the knife. U.S. Pat. No. 1,843,223 to Hasseler discloses a knife having a blade with a slot in the blade. The slot of Hassler is set back towards a middle of the blade and is designed specifically for skinning animals and is limited in its usefulness for opening a shellfish shell. U.S. Pat. No. 720,202 to White discloses a knife with a slot in the tip portion of the utensil that may be used for opening shellfish shells. The slot is configured such that an elongated pointed prong is formed, which is useful for puncturing a surface of an item for enabling use as a can opener. Although the elongated pointed prong is appropriate for the purposes intended by White, the elongated pointed prong would hinder its use as a common dinner knife in so far as a dinner knife is used to apply spreads and the elongated pointed prong would interfere with that function in a conventional manner.

A skilled person will appreciate that, besides utensils configured for cutting or slitting a shellfish shell, there are other types of utensils intended to ease the removal of meat from within a shellfish shell (e.g., a nutcracker style shell opening utensil). With such a nutcracker-style utensil, the shell is placed between two levers and pressure is applied on each lever to crush the shellfish shell and break it open. However, often this type of utensil crushes the meat, and causes it to sliver. Also, the shellfish shell is broken open only at the general area where the pressure is applied, and so meat is often still trapped in other portions of the shellfish shell.

Therefore, a utensil configured for opening shellfish shells in a manner that overcomes shortcomings associated with conventional utensils used for and/or intended for opening shellfish shells would be useful and advantageous.

SUMMARY OF THE DISCLOSURE

The present invention relates to a utensil designed to ease the opening of a shellfish shell of a shellfish for the removal of shellfish meat, but which also provides a dual functionality with respect to the single intended functionality of a standard dinner knife. More specifically, a utensil in accordance with the present invention is designed to replace a dinner knife without taking away any conventional dinner knife functionality while providing additional functionality of being able to slit the shellfish shell of a shellfish for easy removal of the shellfish meat. Such a utensil is referred to herein as a dual-purpose shellfish dinner knife. The dual-purpose shellfish dinner knife has the general shape of a common dinner knife consisting of a handle and a blade.

In one embodiment of the present invention, a utensil configured for opening a shellfish shell comprises a blade and a shell-slitting tine. The blade includes spaced apart longitudinal edges. A first one of the longitudinal edges is generally blunt and a second one of the longitudinal edges is specifically configured for severing objects. The shell-slitting tine is attached to the blade adjacent a tip portion of the blade. A slot extends between the shell-slitting tine and the blade from a tip end of the blade toward the handle. The slot is positioned between a centerline reference axis of the blade and the first one of the longitudinal edges of the blade. A tip end of the shell-slitting tine extends not more than even with the tip end of the blade.

In another embodiment of the present invention, a knife comprises an elongated handle, a blade and a shell-slitting tine. The blade is attached to and extends longitudinally from an end of the handle. The blade includes spaced apart longitudinal edges. A first one of the longitudinal edges is generally blunt and a second one of the longitudinal edges is specifically configured for severing objects. A shell-slitting tine is attached to the blade adjacent a tip portion of the blade. A slot extends between the shell-slitting tine and the blade from the tip end of the blade toward the handle. The slot is positioned between a centerline reference axis of the blade and the first one of the longitudinal edges of the blade. At least a portion of an edge of the shell-slitting tine defined by the slot is sharpened. A tip end of the shell-slitting tine is substantially even with the tip end of the blade.

In another embodiment of the present invention, a method is provided for producing a dinner knife configured for opening a shellfish shell and for offering traditional dinner knife functionality. The method comprises a plurality of operations. An operation is performed for providing a conventional dinner knife having a handle and a blade. The blade is attached to and extends longitudinally from an end of the handle and wherein the blade is configured for providing traditional dinner knife functionality. An operation is performed for forming a slot in the blade at a tip portion of the blade thereby creating a shell-slitting tine integral with the blade. The operation of forming the slot includes forming the slot generally parallel with a centerline reference axis of the blade, positioning the slot between the centerline reference axis of the blade and the first one of the longitudinal edges and shaping a tip end of the shell-slitting tine such that it extends not more than even with the tip end of the blade.

Turning now to specific aspects of the present invention, in at least one embodiment, the tip end of the shell-slitting tine is substantially even with the tip end of the blade.

In at least one embodiment of the present invention, the shell-slitting tine is generally straight, the slot is generally straight and a centerline reference axis of the shell-slitting tine is generally parallel with a centerline reference axis of the slot.

In at least one embodiment of the present invention, the shell-slitting tine is between about 0.5" long and about 1.0" long.

In at least one embodiment of the present invention, the shell-slitting tine is about 0.125" wide.

In at least one embodiment of the present invention, the slot is about 0.125" wide.

In at least one embodiment of the present invention, at least a portion of an edge of the shell-slitting tine defined by the slot is sharpened.

In at least one embodiment of the present invention, a tip end of the shell-slitting tine has rounded profile and the tip end of the blade has rounded profile.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
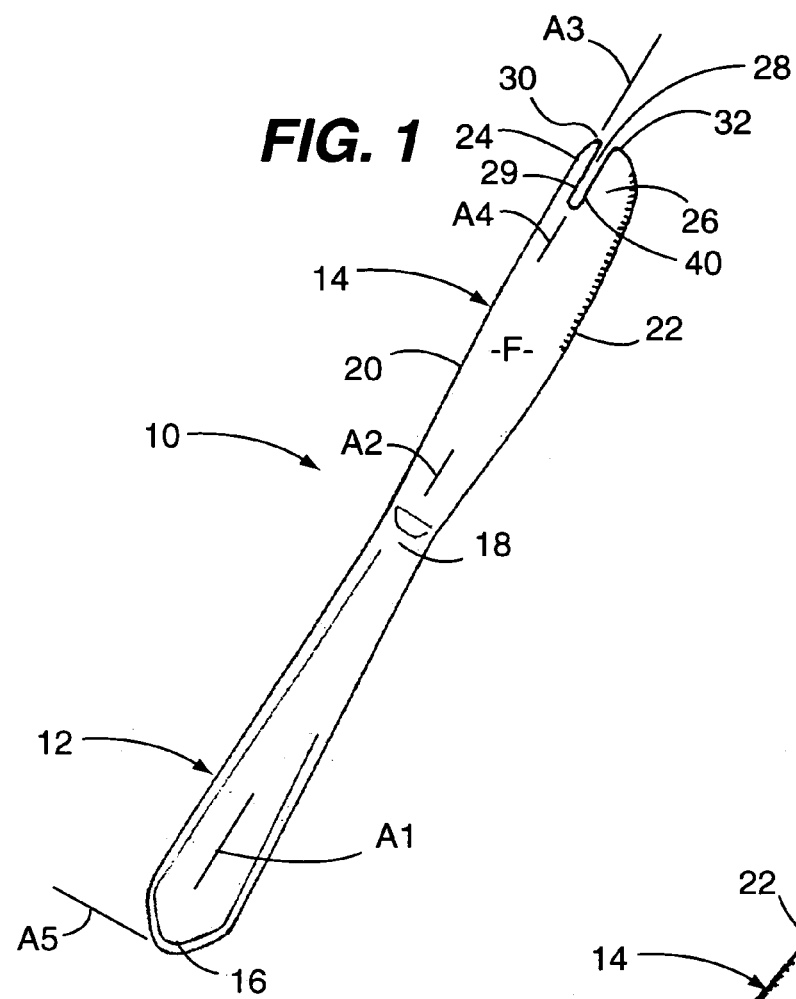
FIG. 1 depicts an embodiment of a dual-purpose shellfish dinner knife in accordance with the present invention.

FIG. 1 shows a dual-purpose shellfish dinner knife in accordance with the present invention, which is referred to herein as the knife 10. The knife 10 offers all the functionality of a conventional dinner knife and offers the functionality of slitting open a shellfish shell. As is discussed below in greater detail, this dual functionality offers a number of advantages and benefits over having to use multiple utensils for providing such functionalities. The knife 10 is an example of a utensil configured for opening a shellfish shell.

The knife 10 has an elongated handle 12 and a blade 14. The handle 12 has a first end portion 16 and a second end portion 18. A user of the knife 10 grasps the knife at least partially between the first end portion 16 and the second end portion 18. The blade 14 is attached to and extends longitudinally from the second end portion 18 of the handle 12. In this configuration, a centerline reference axis A1 of the handle 12 is aligned with a centerline reference axis A2 of the blade 14. The blade 14 includes a first longitudinal edge 20 and a second longitudinal edge 22. The first longitudinal edge 20 is generally blunt and the second longitudinal edge 22 is specifically configured for severing objects. Examples of being configured for severing objects include, but are not limited to, being serrated and being sharpened.

A shell-slitting tine 24 is attached to the blade 14 adjacent a tip portion 26 of the blade 14. A slot 28 extends between the shell-slitting tine 24 and the blade 14 from the tip portion 26 of the blade 14 toward the handle 12. The slot 28 extends generally parallel with the centerline reference axis A2 of the blade 14 and is positioned between the centerline reference axis A2 of the blade 14 and the first longitudinal edge 20 of the blade. At least a portion of a slitting edge 29 of the shell-slitting tine 24 that is defined by the slot 28 is sharpened, serrated or otherwise configured for facilitating slitting of a shellfish shell. The tip end 30 of the shell-slitting tine 24 has a rounded profile and the tip end 32 of the blade 14 has a rounded profile. A tip end 30 of the shell-slitting tine 24 is substantially even with a tip end 32 of the blade 14 (i.e., longitudinal position relative to the centerline reference axis A2 of the blade 14). Another way of describing this configuration is that the tip end 30 of the shell-slitting tine 24 and the tip end 32 of the blade 14 are equidistant from a transverse reference axis A5 when measured along respective lines extending perpendicularly from the transverse reference axis A5.

As depicted in FIG. 1, the shell-slitting tine 24 is generally straight, the slot 28 is generally straight and a centerline reference axis A3 of the shell-slitting tine 24 is generally parallel with a centerline reference axis A4 of the slot 28. In preferred embodiments, the shell-slitting tine 24 is between about 0.5" long and about 1.0" long, the shell-slitting tine 24 is about 0.125" wide (i.e., measure perpendicular to the longitudinal reference axis A3 in a face plane F of the blade 14) and the slot 28 is about 0.125" wide (i.e., measure perpendicular to the longitudinal reference axis A4 in the face plane F of the blade 14). While the abovementioned physical dimensions are preferred in some embodiments, certain embodiments will exhibit physical dimension slightly or significantly different than such physical dimensions.

Figure 2:
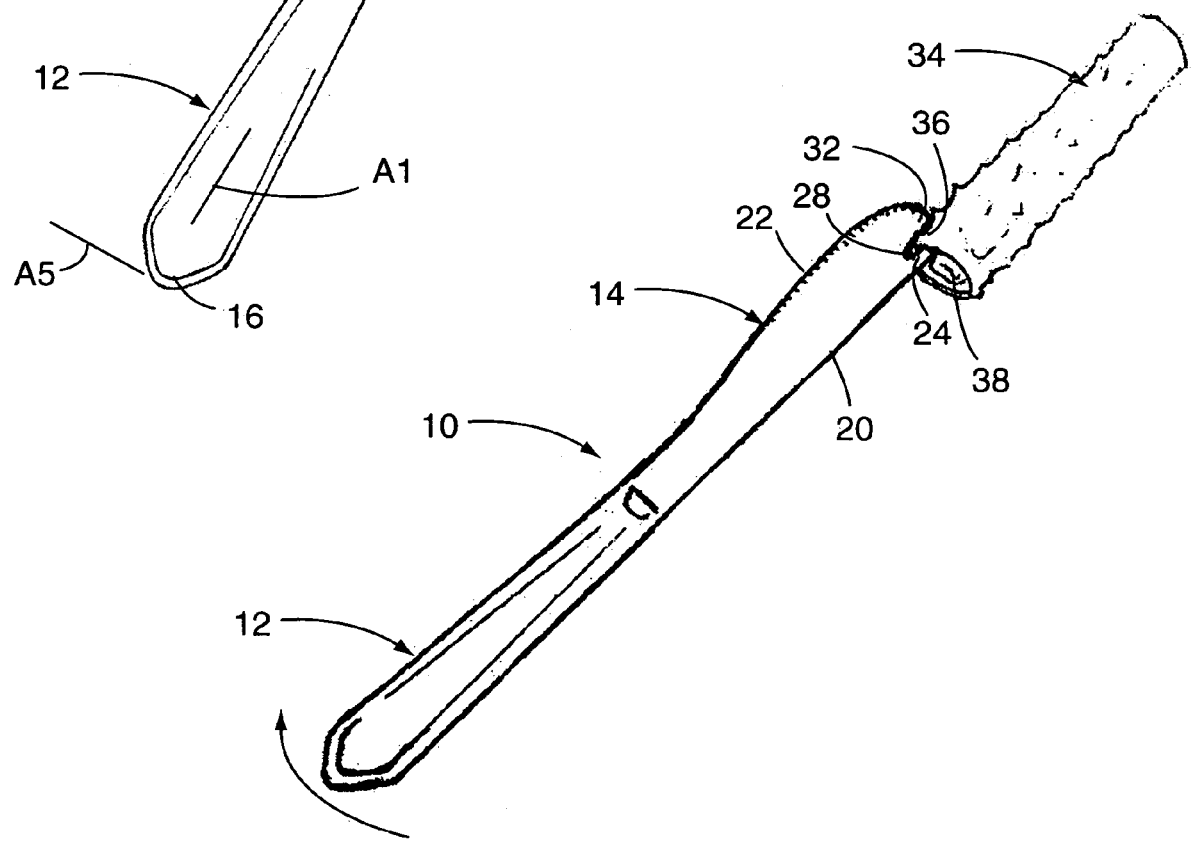
FIG. 2 is a perspective view showing the dual-purpose shellfish dinner knife of FIG. 1 in use.

Referring now to FIGS. 1 and 2, a first technique for using the knife 10 for slitting a shellfish shell 34 (FIG. 2) is described. FIG. 2 illustrates how the knife 10 is engaged with the shellfish shell 34 to enable extraction of shellfish meat 38 from within the shellfish shell 34. The knife 10 is manipulated relative of the shellfish shell 34 such that a wall 36 of the shellfish shell 34 is engaged within the slot 28 of the blade 14 and with the shell-slitting tine 24 positioned inside of the shellfish shell 34. The rounded shape of the tip end 30 of the shell-slitting tine 24 and the shell-slitting tine 24 being generally even with respect to the tip end of the blade 14 both contribute to the shell-slitting tine 24 being easily and readily inserted between the shellfish shell 34 and the shellfish meat 38 within the shellfish shell 34. The rounded tip end 32 of the blade 14 allows the blade-side edge 40 of the slot 28 (i.e., the edge of the slot 28 opposite the slitting edge 29) to smoothly slide along the outside of the shellfish shell 34 while the shell-slitting tine 24 is inserted between the shellfish meat 38 and the inside of wall 36 of the shellfish shell 34.

As can be seen in FIG. 2, the wall 36 of the shellfish shell 34 is positioned within the slot 28 of the blade 14 such that the shell-slitting tine 24 is inside the shellfish shell 34 between the wall 36 and the meat 38. The handle 12 of the knife 10, and thus the entire knife 10, is then rotated (i.e., in a leveraging motion) with respect to the shellfish shell 34. This relative rotation of the knife 10 causes the slitting edge of the shell-slitting tine 24 to sever (e.g. rip, cut, etc) the shellfish shell 34. The knife 10 is then forced along the length of the shellfish shell 34, thus slitting the shellfish shell along its length. The operation of rotating the knife 10 in conjunction with forcing the knife 10 along the length of the shellfish shell 34 may be required or desired to facilitate this shell slitting process. The slitting process may be repeated along another portion of the shellfish shell 34, thus cutting the shellfish shell 34 completely in half lengthwise allowing the shellfish meat 38 to be more easily removed.

Still referring to FIGS. 1 and 2, in accordance with a second technique of using the knife 10, the shellfish shell 34 may be slit using the knife 10 by rotating the handle 12 of the knife 10 away from the shellfish shell 34 in a direction perpendicular to the shellfish shell 34 and towards the end of the shellfish shell 34 farthest from the knife 10 in a levering action. This levering action forces the shell-slitting tine 24 through the shellfish shell 34, thus cutting the shellfish shell 34 along the length of the shell-slitting tine 24. This leveraging action is repeated, pushing the shellfish shell 34 beyond the newly made cut in the shellfish shell 34 into the slot 28 until a slit is formed from one end of the shellfish shell 34 to the other. The slitting process may be repeated along another portion of the shellfish shell 34, thus cutting the shellfish shell 34 completely in half lengthwise allowing the shellfish meat 38 to be more easily removed.

Turning now to a discussion of features, advantages and benefits of a utensil in accordance with the present invention, a skilled person will appreciate that other utensils designed to ease the opening of the shell of shellfish will cost the consumer more than a dual-purpose shellfish dinner knife in accordance with the present invention. Such cost is due to such other utensils being designed specifically or primarily for the purpose of solely facilitating removal of shellfish meat from a shellfish shell. To the contrary, a dual-purpose shellfish dinner knife in accordance with the present invention replaces an already existing common utensil (i.e., the dinner knife) as part of the common flatware setting of knife, fork and spoon.

A dual-purpose shellfish dinner knife in accordance with the present invention replaces a utensil that most consumers and foodservice companies already purchase. So, it is possible that such consumers and companies will no longer need to purchase single purpose dinner knives, as they can use a dual-purpose shellfish dinner knife in accordance with the present invention as a common dinner knife in addition to it functioning as a shellfish shell slitting utensil when needed. Thus, the overall cost is much less for the functionality that is being purchased when compared to other utensils configured for opening shellfish shells. This is most certainly the case for many seafood restaurants, as it is believed that they will no longer need to purchase standard dinner knives for their customers. Thus, in large part if not entirely, the cost of a dual-purpose shellfish dinner knife in accordance with the present invention will be absorbed into the current cost of the necessity to purchase standard dinner knives.

Many other utensils configured for opening a shellfish shell have moving parts, which adversely impacts their manufacturing costs and increases their potential of breaking. To the contrary a dual-purpose shellfish dinner knife in accordance with the present invention has no moving parts and is a modification to an already proven utensil that is reliable and does not often break.

Each place setting at a table of a restaurant typically includes a dinner knife. A dual-purpose shellfish dinner knife in accordance with the present invention will replace the dinner knife at each place setting, thus eliminating any extra employee time required to set tables with the dual-purpose shellfish dinner knife. Such a dual-purpose shellfish dinner knife will replace the standard dinner knife. For instance, currently, seafood restaurants must have their employees set a special set of utensils for any customer that orders crab legs or lobster claws. In fact, they often set 2 extra tools, a leg cracker, and a small thin stick that is used to dig the meat out. Neither of these will be required if 'the customer uses the' dual-purpose shellfish dinner knife. Even if a seafood restaurant decides to continue to provide additional shellfish utensils the fact that our utensil replaces the standard dinner knife means that it requires no more effort than already expended providing the common dinner knife.

Although it may seem insignificant, a dual-purpose shellfish dinner knife in accordance with the present invention also has the potential to reduce a restaurant's cleaning costs. They will not have to wash, dry, and sort any additional utensils than they do now and quite possibly fewer utensils if a dual-purpose shellfish dinner knife in accordance with the present invention is used to replace the current shellfish utensils. Every customer that eats in the restaurant is treated the same, and will get a dual-purpose shellfish dinner knife in accordance with the present invention as part of the common flatware setting of a knife, fork, and spoon.

When using conventional tools and/or approaches for opening shellfish shells, many customers often get frustrated when trying to cut through the shell of their shellfish to get the meat out. Because the tools commonly provided by seafood restaurants are limited in their ability to simply, quickly and intuitively open a shellfish shell, customers tend to stick a tine from their dinner fork into the shell and then often bend and ruin the fork when trying to extract the meat. Most of the time, this action only serves to ruin the fork. The restaurant must replace the fork, and the customer ends up frustrated, as they usually do not succeed in opening the shellfish shell.

Some restaurants provide a utensil that is similar to a nutcracker to break the shellfish shell. However, if the shell is soft due to too much moisture, or even extremely harder than usual, this type of utensil does not work and the meat is never removed. Other times, this type of utensil will crush the shell, and cause the meat to pulverize which makes it harder to eat.

Another use of a dual-purpose shellfish dinner knife in accordance with the present invention is that kitchen employees of a seafood restaurant can also use a dual-purpose shellfish dinner knife in accordance with the present invention to remove the meat from inside a shellfish shell. The meat is often removed by the kitchen employees to be used in a recipe and served to the customer in a dish where the meat is mixed in with other ingredients. Kitchen employees often experience the same frustrations in removing shellfish meat, as do customers. Compounding the issue is that kitchen employees are paid by the hour. So, the longer it takes them to remove the meat, the more the shellfish meat costs the restaurant.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A utensil configured for opening a shellfish shell, comprising:
    a blade including spaced apart longitudinal edges, wherein a first one of said longitudinal edges is generally blunt, wherein a second one of said longitudinal edges is at least one of sharpened and serrated and wherein a tip end of the blade is substantially non-pointed; and
    a shell-slitting tine attached to the blade adjacent the tip end of the blade, wherein a slot extends between the shell-slitting tine and the blade from a tip end of the blade, wherein the slot extends generally parallel with a centerline reference axis of the blade, wherein the slot is positioned between the centerline reference axis of the blade and the first one of said longitudinal edges, wherein a tip end of the shell-slitting tine extends not more than even with the tip end of the blade, and wherein at least a portion of an edge of the shell-slitting tine exposed within the slot is sharpened.

2. The utensil of claim 1 wherein the tip end of the shell-slitting tine is substantially even with the tip end of the blade.

3. The utensil of claim 2 wherein:
    the shell-slitting tine is generally straight;
    the slot is generally straight; and
    a centerline reference axis of the shell-slitting tine is generally parallel with a centerline reference axis of the slot.

4. The utensil of claim 3 wherein:
    the shell-slitting tine is between about 0.5" long and about 1.0" long.

5. The utensil of claim 4 wherein the shell-slitting tine is about 0.125" wide.

6. The utensil of claim 5 wherein the slot is about 0.125" wide.

7. The utensil of claim 1 wherein:
    a tip end of the shell-slitting tine is substantially non-pointed.

8. The utensil of claim 1 wherein:
    the tip end of the shell-slitting tine is substantially even with the tip end of the blade;
    the shell-slitting tine is generally straight;
    the slot is generally straight;
    a centerline reference axis of the shell-slitting tine is generally parallel with, a centerline reference axis of the slot;
    the shell-slitting tine is between about 0.5" long and about 1.0" long;
    the shell-slitting tine is about 0.125" wide;
    the slot is about 0.125" wide; and
    a tip end of the shell-slitting tine is substantially non-pointed.

9. A knife, comprising:
    an elongated handle;
    a blade attached to and extending longitudinally from an end of the handle, wherein the blade includes spaced apart longitudinal edges, wherein a first one of said longitudinal edges is generally blunt, wherein a second one of said longitudinal edges is at least one of sharpened and serrated and wherein a tip end of the blade is substantially non-pointed; and
    a shell-slitting tine attached to the blade adjacent a tip end of the blade, wherein a slot extends between the shell-slitting tine and the blade from the tip end of the blade toward the handle, wherein the slot extends generally parallel with a centerline reference axis of the blade, wherein the slot is positioned between the centerline reference axis of the blade and the first one of said longitudinal edges, wherein at least a portion of an edge of the shell-slitting tine defined by the slot is sharpened, wherein a tip end of the shell-slitting tine is substantially even with the tip end of the blade, and wherein at least a portion of an edge of the shell-slitting tine exposed within the slot is sharpened.

10. The knife of claim 9 wherein:
    the shell-slitting tine is generally straight;
    the slot is generally straight; and
    a centerline reference axis of the shell-slitting tine is generally parallel with a centerline reference axis of the slot.

11. The knife of claim 10 wherein:
    the shell-slitting tine is between about 0.5" long and about 1.0" long;
    the shell-slitting tine is about 0.125" wide; and
    the slot is about 0.125" wide.

12. The knife of claim 11 wherein:
    a tip end of the shell-slitting tine is substantially non-pointed.

13. A method for providing a dinner knife configured for opening a shellfish shell and for offering traditional dinner knife functionality, the method comprising:
    providing a conventional dinner knife having a handle and a blade, wherein the blade includes an non-sharpened longitudinal edge and a sharpened longitudinal edge, wherein the blade is attached to and extends longitudinally from an end of the handle and wherein the blade has a substantially non-pointed tip end;
    forming a slot in the tip end of the blade thereby creating a shell-slitting tine integral with the blade, wherein forming the slot includes forming the slot generally parallel with a centerline reference axis of the blade, positioning the slot between the centerline reference axis of the blade and the non-sharpened longitudinal edge, and shaping a tip end of the shell-slitting tine such that it extends not more than even with the tip end of the blade; and
    sharpening at least a portion of an edge of the shell-slitting tine exposed within the slot.

14. The method of claim 13 wherein shaping the tip end of the shell-slitting tine includes shaping the tip end of the shell-slitting tine to be substantially even with the tip end of the blade.

15. The method of claim 13 wherein forming the slot includes:
    forming the slot to be generally straight; and
    forming the slot such that a centerline reference axis of the shell-slitting tine is generally parallel with a centerline reference axis of the slot.

16. The method of claim 15 wherein forming the slot includes forming the slot to be between about 0.5" long and about 1.0" long.

17. The method of claim 16 wherein forming the slot includes forming the slot to be about 0.125" wide.

18. The method of claim 13, further comprising:
rounding a corner of the blade made sharp by formation of the slot; and
rounding a corner of the shell-slitting tine made sharp by formation of the slot.

19. The method of claim 13, further comprising:
rounding a corner of the blade made sharp by formation of the slot; and
rounding a corner of the shell-slitting tine made sharp by formation of the slot;

wherein shaping the tip end of the shell-slitting tine includes shaping the tip end of the shell-slitting tine to be substantially even with the tip end of the blade;

wherein forming the slot includes forming the slot to be generally straight and forming the slot such that a centerline reference axis of the shell-slitting tine is generally parallel with a centerline reference axis of the slot;

wherein forming the slot includes forming the slot to be between about 0.5" long and about 1.0" long; and wherein forming the slot includes forming the slot to be about 0.125" wide.

* * * * *